(12) United States Patent
Oooka

(10) Patent No.: US 10,332,400 B2
(45) Date of Patent: Jun. 25, 2019

(54) INTRA-LANE TRAVEL CONTROL APPARATUS AND INTRA-LANE TRAVEL CONTROL METHOD

(71) Applicant: DENSO CORPORATION, Kariya, Aichi-pref. (JP)

(72) Inventor: Masao Oooka, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/740,646

(22) PCT Filed: Jun. 20, 2016

(86) PCT No.: PCT/JP2016/068251
§ 371 (c)(1),
(2) Date: Dec. 28, 2017

(87) PCT Pub. No.: WO2017/002650
PCT Pub. Date: Jan. 5, 2017

(65) Prior Publication Data
US 2018/0197414 A1    Jul. 12, 2018

(30) Foreign Application Priority Data

Jul. 1, 2015    (JP) .................. 2015-132705

(51) Int. Cl.
*G08G 1/16*        (2006.01)
*B60T 7/12*        (2006.01)
(Continued)

(52) U.S. Cl.
CPC ............... *G08G 1/161* (2013.01); *B60T 7/12* (2013.01); *B60W 30/12* (2013.01);
(Continued)

(58) Field of Classification Search
CPC ...... G08G 1/161; G08G 1/0125; G08G 1/167; B60W 30/12; B60W 40/06;
(Continued)

(56) References Cited

U.S. PATENT DOCUMENTS 9,063,548 B1\* 6/2015 Ferguson ............. G05D 1/0231
2009/0118994 A1   5/2009 Mori et al.

FOREIGN PATENT DOCUMENTS

JP    2007-004669 A    1/2007
JP    2007-008281 A    1/2007
(Continued)

*Primary Examiner* — Gertrude Arthur Jeanglaude
(74) *Attorney, Agent, or Firm* — Knobbe, Martens, Olson & Bear, LLP

(57) ABSTRACT

A traffic lane acquisition section obtains traffic lane information that includes the road shape of a host-vehicle lane, from road map information, based on the detected position of a host vehicle, expressed by position information obtained by a host vehicle position acquisition section. Based on detected positions of traffic lane identification-use objects, contained in object information obtained by an object acquisition section, a lane boundary line identification section identifies lane boundary lines. A region estimation section estimates a displacement-possible region of the host-vehicle lane ahead of the host vehicle, based on the lane boundary lines that are obtained by the lane boundary line identification section. If a predetermined lane reliability condition is not satisfied for the lane boundary lines, then the accuracy of estimating the displacement-possible region is updated by using the road shape of the host-vehicle lane from the traffic lane information obtained by the traffic lane acquisition section.

14 Claims, 8 Drawing Sheets

(51) Int. Cl.
  *B60W 30/12* (2006.01)
  *G05D 1/02* (2006.01)
  *G08G 1/01* (2006.01)
  *G06K 9/00* (2006.01)
  *B62D 15/02* (2006.01)
  *B60T 8/17* (2006.01)

(52) U.S. Cl.
  CPC ....... *B62D 15/025* (2013.01); *B62D 15/0265* (2013.01); *G05D 1/0214* (2013.01); *G06K 9/00798* (2013.01); *G08G 1/0125* (2013.01); *G08G 1/167* (2013.01); *B60T 8/17* (2013.01); *B60T 2201/089* (2013.01); *B60W 2550/14* (2013.01); *B60W 2550/20* (2013.01); *B60W 2550/22* (2013.01); *B60W 2550/30* (2013.01); *B60W 2550/402* (2013.01); *G05D 2201/0213* (2013.01)

(58) Field of Classification Search
  CPC . B60W 2550/14; B60W 2550/20; B62D 6/00; G05D 1/0214; G06K 9/00798; B60T 7/12; B60T 8/17
  USPC .......................................................... 701/23
  See application file for complete search history.

(56) References Cited

FOREIGN PATENT DOCUMENTS

| | | |
|---|---|---|
| JP | 2007-137248 | 6/2007 |
| JP | 2009-252198 A | 10/2009 |
| JP | 2010-235062 | 10/2010 |
| JP | 2010-241264 | 10/2010 |

\* cited by examiner

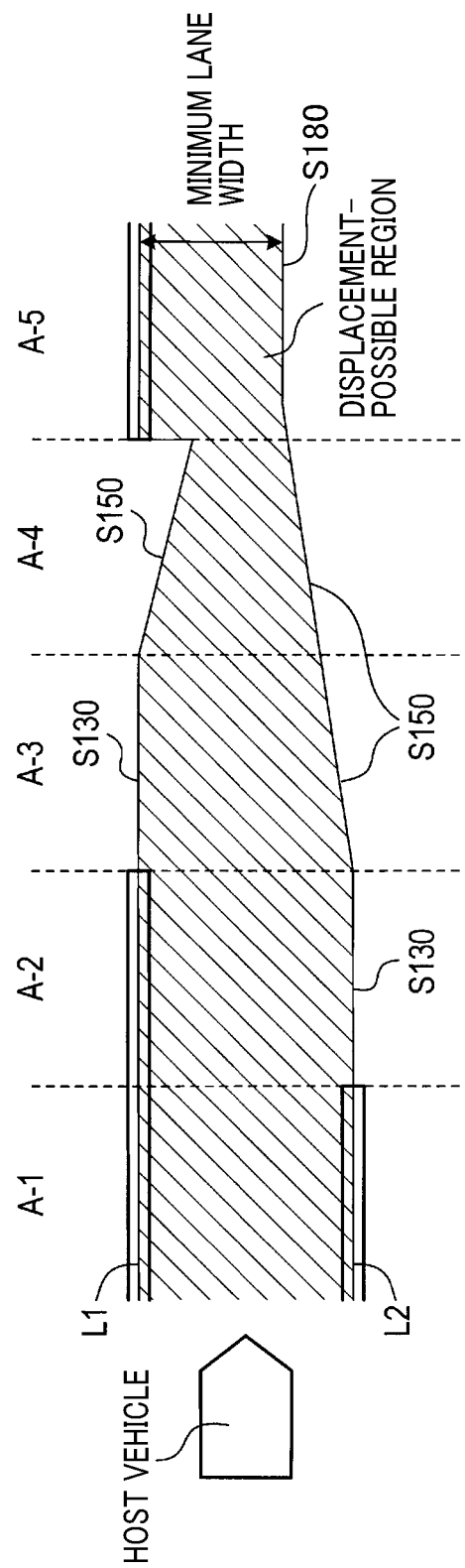

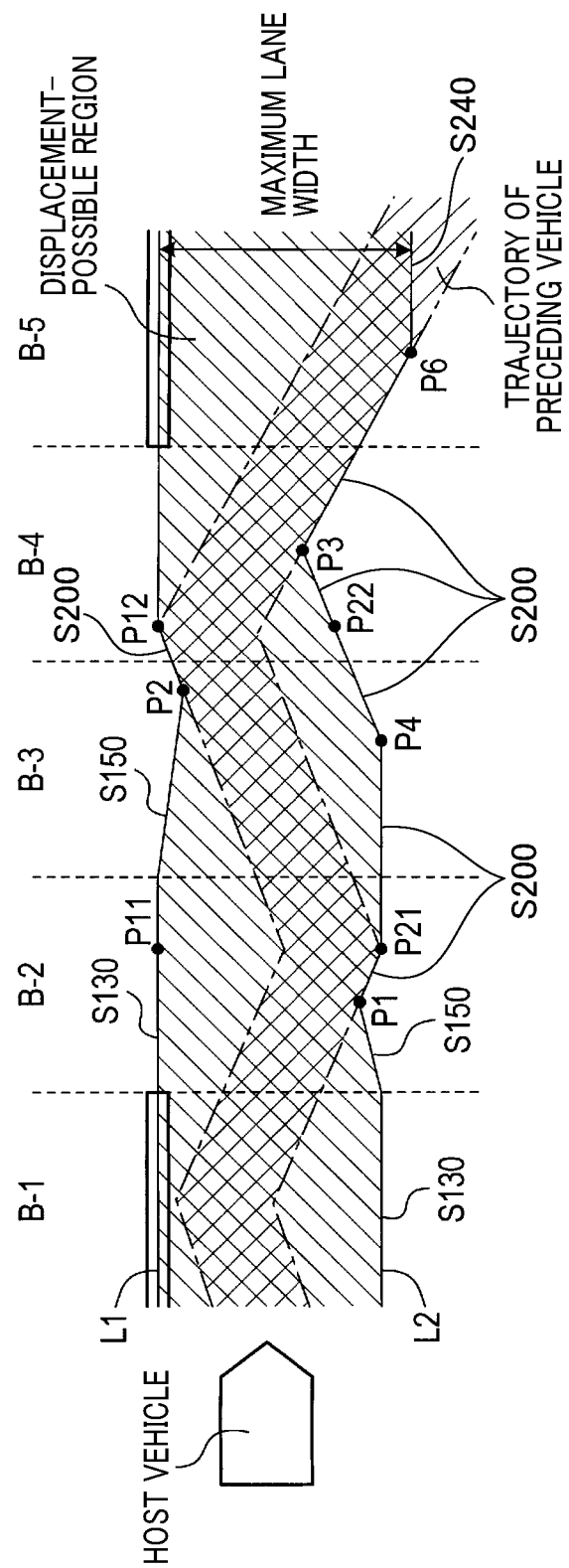

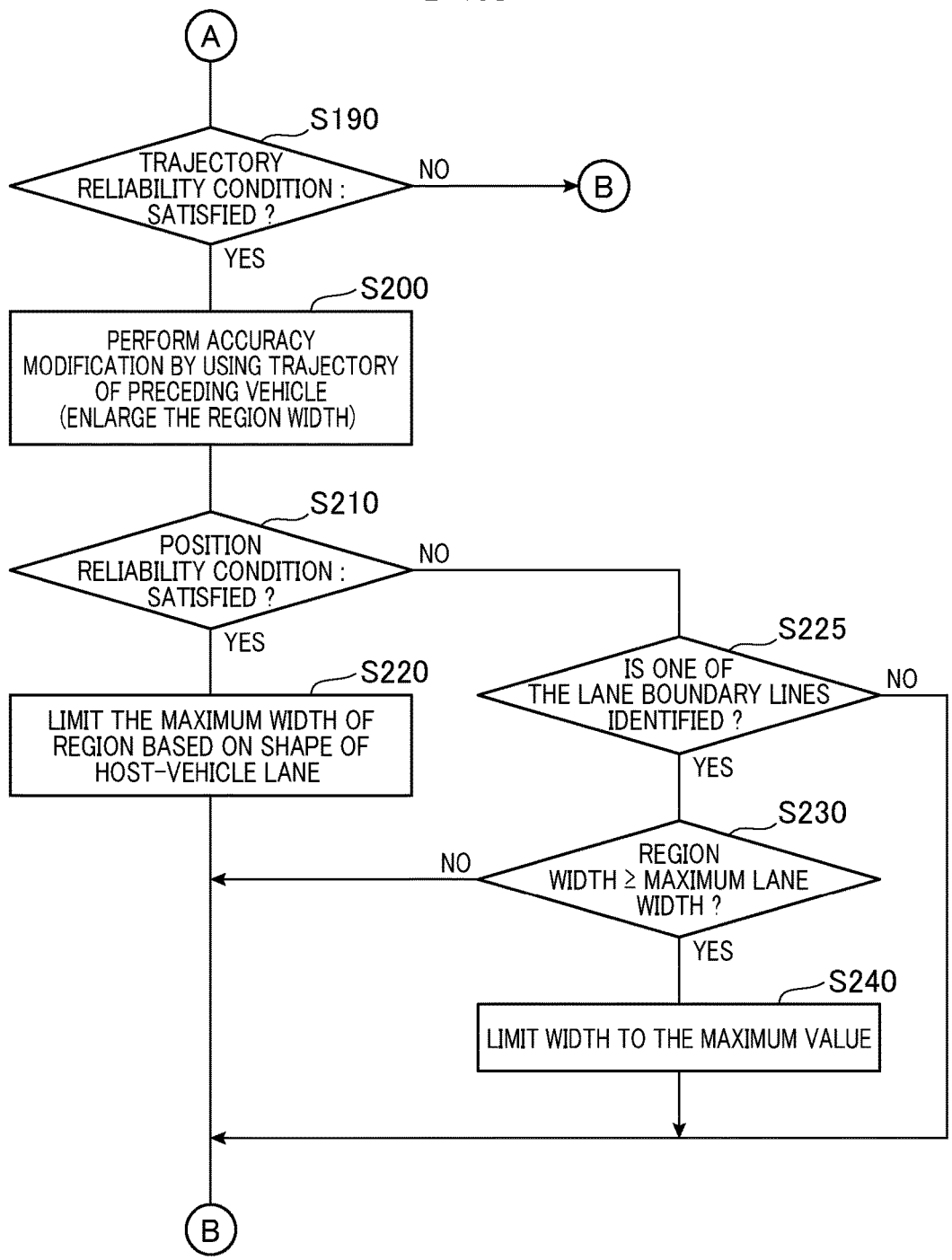

INTRA-LANE TRAVEL CONTROL APPARATUS AND INTRA-LANE TRAVEL CONTROL METHOD

CROSS-REFERENCE TO RELATED APPLICATION

This application is based on and claims the benefit of priority from earlier Japanese Patent Application No. 2015-132705 filed on Jul. 1, 2015, the description of which is incorporated herein by reference.

TECHNICAL FIELD

The present disclosure relates to technology for estimating a displacement-possible region that is ahead of a host vehicle, within a host vehicle lane.

BACKGROUND ART

Conventionally, the following type of technology is known. Specifically, lane boundary lines (referred to in the following as white lines) that define the traffic lane in which a host vehicle is traveling (referred to in the following as the host-vehicle lane) are identified based on captured images of a region ahead of the host vehicle. The traffic lane width (displacement-possible region) of the host-vehicle lane is then estimated based on the identified white lines, etc.

The traffic lane width which is thus estimated is used, together with the current position of the host vehicle, the velocity vector, and the vehicle width, etc., as information that is required for executing control (referred to in the following as intra-lane travel control) in the host-vehicle lane, with a known type of lane-departure warning and driving support, etc.

Furthermore technology has been proposed (see PTL 1) with such a type of intra-lane travel control, whereby when the white lines cannot be identified but the width of a preceding vehicle can be calculated, the traffic lane width is estimated based on the width of the preceding vehicle.

CITATION LIST

Patent Literature

[PTL 1] JP 2009-252198 A

SUMMARY OF THE INVENTION

Technical Problem

However with such technology there is the problem that, when neither the white lines nor a preceding vehicle can be identified, it may not be possible to accurately estimate the traffic lane width.

Furthermore in recent years, a high-level form of intra-lane travel control technology is being developed. Specifically, there is Lane Trace Control (LTC), etc., whereby a travel line is set within the host-vehicle lane, and the steering, driving force, braking, etc., are controlled such that the host vehicle travels along the set travel line.

However, with that type of high-level intra-lane travel control similarly, there is the problem in that when neither the white lines nor a preceding vehicle can be identified, it may not be possible to accurately set the travel line.

Furthermore, with that type of high-level intra-lane travel control, even when it is possible to identify a preceding vehicle, the travel line may be directly set as the trajectory of the preceding vehicle. For that reason, the host vehicle may follow a wobbling path of a preceding vehicle, thereby possibly causing interference with stable operation of the host vehicle.

It is an objective of the present disclosure to provide a technology for enhancing the travel stability of a host vehicle, by ensuring accuracy of estimating a displacement-possible region that is within a host-vehicle lane, ahead of the host vehicle, even when white lines, etc., cannot be identified.

Solution of Problem

An intra-lane travel control apparatus according to one embodiment of the present disclosure is a control apparatus that is installed in a vehicle, and includes object acquisition means, host vehicle position acquisition means, traffic lane acquisition means, boundary line identification means, region identification means, and information outputting means. The object acquisition means acquires object information that includes the detected position of an object that is ahead of the host vehicle. The host vehicle position acquisition means acquires position information that expresses a detected position of the host vehicle.

The traffic lane acquisition means obtains traffic lane information that includes the shape of the road of the host-vehicle lane, which is a traffic lane in which the host vehicle is traveling, with the traffic lane information being obtained from road map information that includes the road shape information, based on a detected position of the host vehicle that is expressed by position information obtained by the host vehicle position acquisition means. The boundary line identification means obtains lane boundary lines which define the host-vehicle lane, based on position information for specific traffic lane identification-use objects, with that position information being contained in the object information which is obtained by the object acquisition means.

The region identification means estimates a displacement-possible region that is ahead of the host vehicle, within the host-vehicle lane, based on the lane boundary lines that are identified by the boundary line identification means. At that time, if predetermined traffic lane reliability conditions are not satisfied for the lane boundary lines that are identified by the boundary line identification means, the region acquisition means compensates the estimation accuracy of the displacement-possible region, using the road shape of the host-vehicle lane as expressed by the traffic lane information that is obtained by the traffic lane acquisition means. The information outputting means outputs information based on the displacement-possible region that is estimated by the region estimation means.

In that way with an intra-lane travel control apparatus according to the present disclosure, the shape of a road containing the host-vehicle lane, expressed by traffic lane information, is used when estimating a displacement-possible region that is ahead of the host vehicle, within the host-vehicle lane. As a result, with an intra-lane travel control apparatus according to the present disclosure, accurate estimation of the displacement-possible region can be achieved with a comparatively high degree of probability without dependence on the surrounding conditions of the host vehicle, such as presence or absence of a preceding vehicle. Furthermore with an intra-lane travel control apparatus according to the present disclosure, a relatively smooth travel line can be drawn (can be set), based on the displacement-possible region which is thus estimated.

Hence with the technology of the present disclosure, the travel stability of the host vehicle can be enhanced by supplementing the accuracy of estimating the displacement-possible region, even for example in a case in which the white lines, etc., cannot be identified.

Moreover, with an intra-lane travel control method which is one technical aspect of the present disclosure, for similar reasons to those above, the same effects can be obtained as those described above for an intra-lane travel control apparatus according to the present disclosure.

The signs shown in parentheses in the claims indicate a relationship to concrete means specified in embodiments that are described hereinafter. Hence the descriptions do not limit the technical scope of the present disclosure.

BRIEF DESCRIPTION OF THE DRAWINGS

FIG. 4A is a first birds-eye view diagram that exemplifies a displacement-possible region.

FIG. 4B is a second birds-eye view diagram that exemplifies a displacement-possible region.

FIG. 7 is a flow diagram of displacement-possible region estimation processing (2/2).

DESCRIPTION OF EMBODIMENTS

Embodiments to which the technology of the present disclosure is applied are described in the following, using the drawings.

[1. First Embodiment]
[1-1. Overall Configuration]

Figure 1:
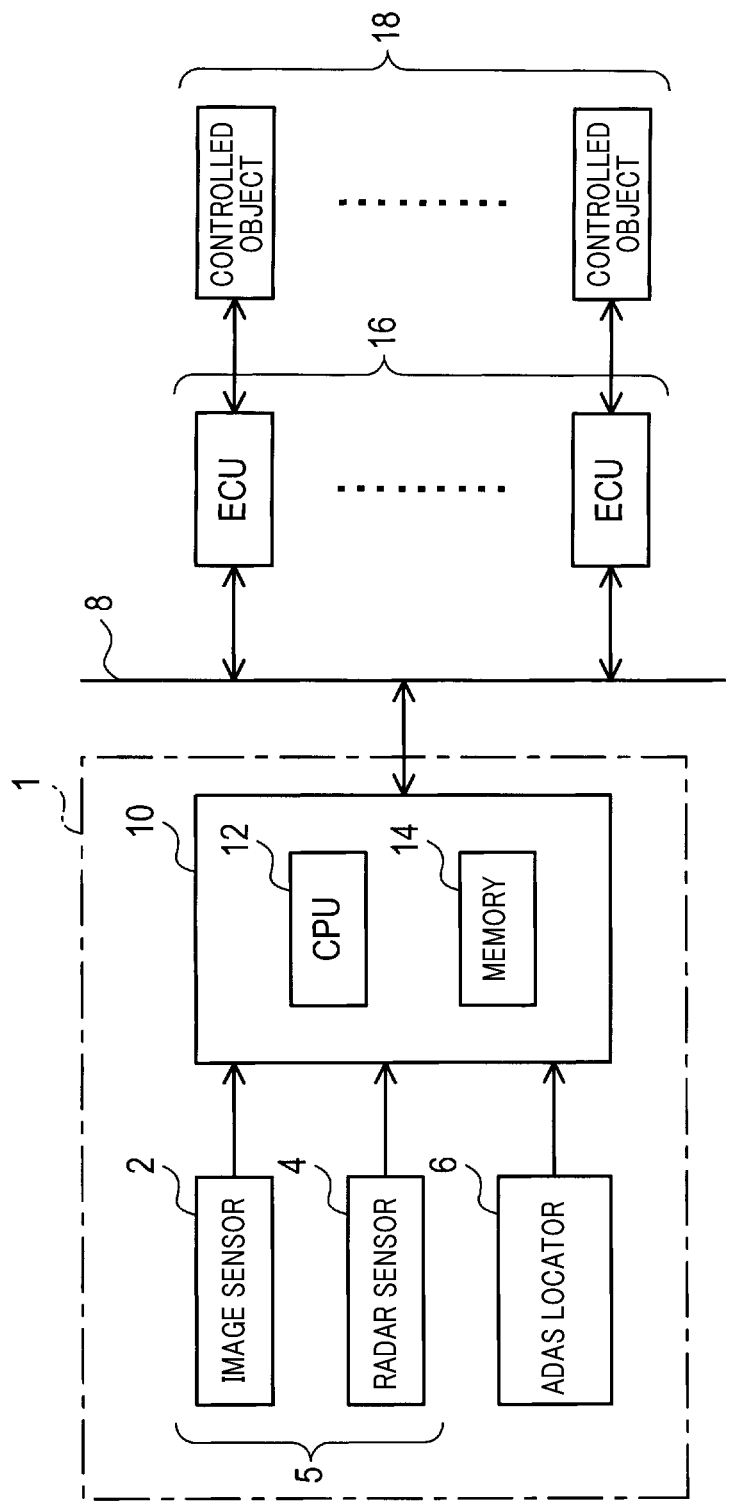
FIG. 1 is a block diagram showing an overall configuration that includes an intra-lane travel control apparatus.

The intra-lane travel control apparatus 1 shown in FIG. 1 is equipped with an image sensor 2, a radar sensor 4, an ADAS locator 6 and an intra-lane travel control unit 10. Furthermore the intra-lane travel control apparatus 1 is connected to an in-vehicle LAN 8 (hereinafter referred to as an in-vehicle LAN). The in-vehicle LAN 8 is connected to respective electronic control units (hereinafter referred to as ECUs) 16. The ECUs 16 are connected to respectively corresponding controlled objects 18 and sensors (not shown in the drawings). In the following, a vehicle in which these constituent elements are carried or installed is referred to as the host vehicle.

The ECUs 16, and the controlled objects 18 and sensors corresponding to these ECUs 16 constitute respective vehicle control systems (not shown in the drawings). Each of the vehicle control systems is a known type of network system that is installed in the host vehicle. Through their respective ECUs 16, the vehicle control systems perform, for example, engine control, steering control, braking control, human-machine interface (hereinafter referred to as a HMI), etc.

Each of the controlled objects 18 is a component that is controlled by a corresponding one of the ECUs 16. Examples of the controlled objects 18 include the ignition mechanism, the fuel system, the intake and exhaust system, the valve train mechanism and the starter mechanism of the engine, pumps and motors of the steering system, actuators of the braking system, display devices, audio devices and vibrator devices of the HMI, etc. Each of the sensors detects information that is required for control by an ECU 16. Examples of the sensors include respective detection devices for detecting the degree of accelerator pedal depression, the amount of actuation of the steering wheel, the degree of brake pedal depression, the operation states of respective switches, and the speed, acceleration, steering angle and yaw rate, etc., of the host vehicle.

The ECU 16 is mainly configured of a known type of microcomputer, a communication controller for in-vehicle network use, etc. The ECU 16 controls driving of the controlled object 18 which has been allocated to it beforehand, or controls outputting from that controlled object 18, based on detection information that is acquired from various sensors, vehicle information that is received via the in-vehicle LAN 8, etc. The vehicle information is information that is shared between the intra-lane travel control unit 10 and the ECUs 16, for optimizing the operation of the vehicle control systems overall. Examples of the vehicle information include sensor detection information, command information for driving the controlled objects 18 of the ECUs 16, or for obtaining outputs from these controlled objects 18, target object information, etc. The travel target information is information that is based on a displacement-possible region which is ahead of the host vehicle, as described hereinafter. Examples of the travel target information include information that expresses the displacement-possible region itself, information expressing a travel line that is set within the traffic lane in which the host vehicle is traveling (hereinafter referred to as the host-vehicle lane), etc.

The ECUs 16 perform the following types of control, based on travel target information that is received from the intra-lane travel control unit 10 via the in-vehicle LAN 8, and information expressing the current position, the velocity vector, and width, etc., of the host vehicle. The ECUs 16 control for example the steering torque, the drive force, and braking force, etc., such that host vehicle will travel along the travel line that is set within the host-vehicle lane. The ECUs 16 also control the steering, for example, such as to prevent the host vehicle from departing from the displacement-possible region, or departing from the host-vehicle lane, and control the generating of lane departure warnings. Generating of lane departure warnings is performed for example through information that is supplied to the display apparatus, audio apparatus, etc., or by operation of a vibration apparatus that is installed in the steering system. The ECUs 16 also transmit detection information, etc., expressing the speed, steering angle, yaw rate, etc., of the host vehicle, to the intra-lane travel control unit 10 via the in-vehicle LAN 8, for use in calculating the velocity vector of the host to vehicle.

The in-vehicle LAN 8 is a local area network that is disposed in the interior of the host vehicle. The in-vehicle LAN 8 uses for example a communication protocol such as CAN, FlexRay, LIN, MOST, AVC-LAN, etc., to transfer various types of information.

The ADAS locator 6 is a position information detection unit which is used in an advanced driver assistance system (ADAS). The ADAS locator 6 mainly uses the arrival times of radio waves that are received from a GPS (Global Positioning System) to detect the current position of the host vehicle. In a case in which radio waves cannot be received from GPS satellites, such as when the host vehicle is traveling through a tunnel, the current position of the host vehicle is supplemented using detected information on the speed, acceleration, steering angle, yaw rate, etc., of the host vehicle, and the position information from a magnetic sensor (not shown in the drawings). The ADAS locator 6 periodically outputs, to the intra-lane travel control unit 10, position information expressing the currently detected position of the host vehicle. With this embodiment, when the current position of the host vehicle is calculated in a condition in which radio waves cannot be received from GPS satellites, the position information contains a flag which indicates that condition.

Furthermore the ADAS locator 6 includes a map database (hereinafter referred to as a map DB) which contains road map information that relates position information to values of latitude and longitude, etc. A digital road map is expressed by a combination of nodes and links. A node represents an intersection point or other connection point that appears in a road network, and a link represents a section of road between two nodes. Hence the road map information includes link information expressing links that constitute roads, and node information that expresses nodes which connect pairs of links. The link information includes link lengths, link widths, connecting nodes, curve information, etc. For that reason, the road shape corresponding to the position information can be extracted from the road map information. Furthermore the map DB stores additional information, including roads that are restricted to vehicles, high-speed roads, general types of roads, and the numbers of traffic lanes, etc. With this embodiment, the ADAS locator 6 outputs the following information to the intra-lane travel control unit 10, in accordance with commands from the intra-lane travel control unit 10. Based on the current position of the host vehicle, the ADAS locator 6 reads out, from the map DB, traffic lane information that includes the shape and the type of traffic lanes in the road ahead of the host vehicle.

The image sensor 2 and the radar sensor 4 constitute an object detection unit 5, which is used in the advanced driving support system. The object detection unit 5 detects the positions, etc., of objects that are within the surroundings of the host vehicle, including the region ahead of the host vehicle. With this embodiment, the object detection unit 5 may for example perform fusion (coalescing), combining and linking of the detection results respectively obtained from the image sensor 2 and the radar sensor 4, using a known method of sensor fusion. Alternatively, a combination of these may be used. As a result, the object detection unit 5 outputs object information to the intra-lane travel control unit 10 that includes the positions of objects, the object information being generated with the individual detection errors of the image sensor 2 and the radar sensor 4 being mutually corrected. Such an object may be another vehicle, or a traffic lane identification-use object, etc. Traffic lane identification-use objects include for example, white lines on the road surface (hereinafter referred to as a road-surface paint lines) formed by paint on the road surface, and can also include roadside objects such as guardrails, curbs, etc. With this embodiment, the object information that is outputted from the object detection unit 5 to the intra-lane travel control unit 10 includes, other than the positions of objects, information relating to the types of objects, and the widths of the objects. Furthermore the respective positions of the right-side edge and of the left-side edge of an object, which define the width of the object, are expressed in the object information.

The image sensor 2 captures images of a region ahead of the host vehicle, and detects the positions of objects based on the captured images (hereinafter referred to as the forward images). Specifically, the image sensor 2 has a known type of image sensor such as a CMOS or CCD sensor, etc., and is disposed facing ahead of the host vehicle for example, with the optical axis oriented slightly downward from the horizontal direction, and captures images of a region within a predetermined angular range which extends from the position of the image sensor 2. Light which arrives from a direction ahead of the host vehicle is subjected to optoelectric conversion by the image elements, to obtain a signal from the voltages of stored charges, with the signal being subjected to A/D conversion for obtaining a digital image (forward image) which has predetermined brightness gradations. The image sensor 2 executes image processing for extracting an object from the forward image (for example a known type of pattern matching or edge detection processing, etc.). In that way the image sensor 2 identifies respective objects such as other vehicles, traffic lane identification-use objects, etc., and detects the positions of each of the objects based on the vertical position and FOE (Focus of Expansion) position of the object in the forward image. At that time, the image sensor 2 can for example detect the position of each object as a position within a 2-dimensional coordinate horizontal plane representing the road surface in real space, with the current position of the mid-point of the front end of the host vehicle as reference. In the following, that 2-dimensional coordinate horizontal plane is referred to as the XY coordinate plane.

The radar sensor 4 detects the positions of objects ahead of the host vehicle in the XY coordinate plane based on reflected waves. The radar sensor 4 transmits, for example, millimeter-range waves, light waves, or sound waves as radar waves, and receives resultant reflected waves from the objects. Based on the interval that elapses from the time of transmitting the radar waves until the reflected waves are received from an object, the radar sensor 4 calculates the distance (relative distance) of the object. The direction of the object relative to the host vehicle is determined based on the reception direction of the reflected waves. For that reason, the radar sensor 4 can detect the position of an object from the calculated values of distance and direction of the object. Specifically, in the case of millimeter-wave radar, the radar sensor 4 transmits frequency-modulated millimeter-range waves using triangle wave, from an antenna, as transmission waves, which are received by the antenna as reflected waves from an object that is ahead of the host vehicle, and are subjected to mixing. As a result of the mixing, a beat signal is obtained from the radar waves. The waveform of the beat signal changes in accordance with the distance and relative speed of the object. Hence, the relative speed and relative distance of an object can be calculated based on waveforms having such types of variation characteristics. Furthermore since reflected waves are received when an object is in the radiation direction of the radar waves, the direction of an object that is ahead of the host vehicle can be detected. Furthermore, based on an array (in order) of a plurality of detected positions of an object, a roadside object such as a guardrail, etc., or another vehicle, can be identified.

[1-2 Configuration of Intra-Lane Travel Control Unit 10]

The intra-lane travel control unit 10 consists mainly of a known type of microcomputer having a CPU 12, and a semiconductor memory 14 (hereinafter referred to as a memory) such as RAM, ROM, a flash memory or the like, and an in-vehicle controller or the like, for use by an in-vehicle network. The intra-lane travel control unit 10 performs various types of processing through execution by the CPU 12 of various types of programs that are stored in the semiconductor memory 14. That is to say, the intra-lane travel control method of the present disclosure is implemented by execution of the programs by the CPU 12. It should be noted that the intra-lane travel control unit 10 may have one or a plurality of microcomputers, and the microcomputers may be installed at any locations within the interior of the host vehicle.

Figure 2:
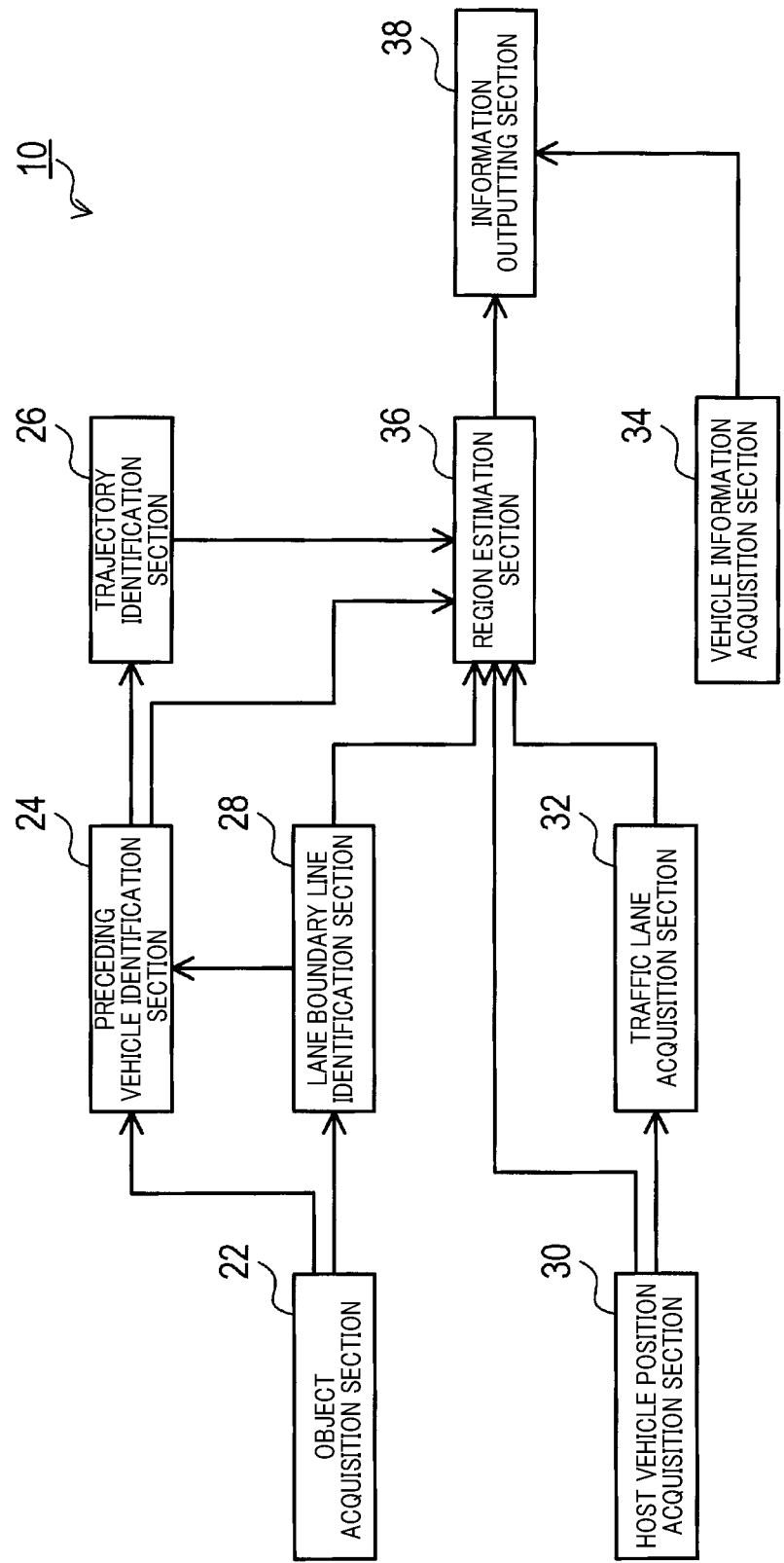
FIG. 2 is a block diagram showing the functional configuration of an intra-lane travel control unit.

The intra-lane travel control unit 10 is provided with the following types of processing sections, as a functional configuration which is implemented through various types of processing executed by the CPU (i.e., a functional configuration implemented by software). Specifically, as shown in FIG. 2, the intra-lane travel control unit 10 includes an object acquisition section 22, a preceding vehicle identification section 24, a trajectory calculation section 26, a lane boundary line identification section 28, a host vehicle position acquisition section 30, a traffic lane acquisition section 32, a vehicle information acquisition section 34, a region estimation section 36, and an information outputting section 38. It should be noted that these functions provided by the intra-lane travel control unit 10 could be determined such that a part of all of a function is implemented by one or a plurality of logic circuits, or is implemented by electronic circuitry such as integrated circuits (ICs) or the like. That is to say, it would be equally possible to implement these functions by using a hardware configuration.

The object acquisition section 22 has a function of acquiring object information that includes the positions of objects that are detected by the object detection unit 5, and functions as object acquisition means. Specifically, the object acquisition section 22 receives the object information synchronized with outputs from the object detection unit 5. The object acquisition section 22 transmits to the preceding vehicle identification section 24 a part of the received object information that relates to other vehicles, and transfers object information that relates to traffic lane identification-use objects to the lane boundary line identification section 28.

The lane boundary line identification section 28 has a function of identifying the lane boundary lines that define the host-vehicle lane, based on the detected positions of the traffic lane identification-use objects contained in the object information which is obtained by the object acquisition section 22, and functions as lane boundary line identification means. Specifically for example, the lane boundary line identification section 28 extracts respective center positions of a road surface paint line, with respect to the width direction of the road surface paint line, as the detected positions of a traffic lane identification-use object, and applies the Hough transform to a plurality of these extracted detected positions. In that way, a model expression of the host-vehicle lane is obtained. The model expression expresses the respective positions of the right-side and left-side lane boundary lines of the host vehicle lane. The coefficients in the model expression include the extinction points of the identified lane boundary lines, the degree of road curvature, the yaw rate, the width, offset amount, etc. The lane boundary line identification section 28 outputs boundary line information that expresses the model expression obtained for these lane boundary lines, to the preceding vehicle identification section 24 and to the region estimation section 36, etc. With this embodiment, if one or both of the right-side and left-side lane boundary lines that define the host vehicle cannot be identified, the boundary line information is outputted containing a flag which indicates the side(s) of the lane boundary line(s) that could not be identified. In addition to road surface paint lines, the lane boundary line identification section 28 can identify the respective lane boundary lines, for example by applying offsets to the detected positions of roadside objects such as guardrails, curbs, etc. Hence, the types of traffic lane identification-use objects used in identification of the respective lane boundary lines are included in the boundary line information that is outputted by the lane boundary line identification section 28.

The preceding vehicle identification section 24 has a function of identifying a preceding vehicle that is traveling in the host-vehicle lane, the identification being based on detected positions of other vehicles, with these detected positions being contained in the object information which is acquired by the object acquisition section 22, and functions as preceding vehicle identification means. Specifically, the preceding vehicle identification section 24 tracks the locuses of the detected positions of other vehicles (hereinafter referred to as forward vehicles) that are positioned ahead of the host vehicle, with the tracking being based on object information that is obtained from the object acquisition section 22. In that way a decision is made, for each of the respective forward vehicles, as to whether it is a forward vehicle (hereinafter referred to as a preceding vehicle) which is traveling in the same advancement direction as that of the host vehicle. In a case in which the white lines can be specified based on the boundary line information that is acquired from the lane boundary line identification section 28, a decision can be made for each of respective preceding vehicles as to whether or not it is a preceding vehicle that is traveling in the host-vehicle lane. The preceding vehicle identification section 24 outputs preceding vehicle information to the trajectory calculation section 26 and the region estimation section 36, etc., where the preceding vehicle information expresses the position of an identified preceding vehicle that is traveling in the host-vehicle lane. With this embodiment, when no preceding vehicle is identified in the host-vehicle lane, a flag which indicates that condition is inserted in the outputted preceding vehicle information. Furthermore with this embodiment, once a vehicle has been judged to be a preceding vehicle which is in the host-vehicle lane, the preceding vehicle identification section 24 thereafter outputs preceding vehicle information which is obtained by tracking the detected positions of that vehicle, with the tracking being performed irrespective of subsequent judgement results.

Figure 5:
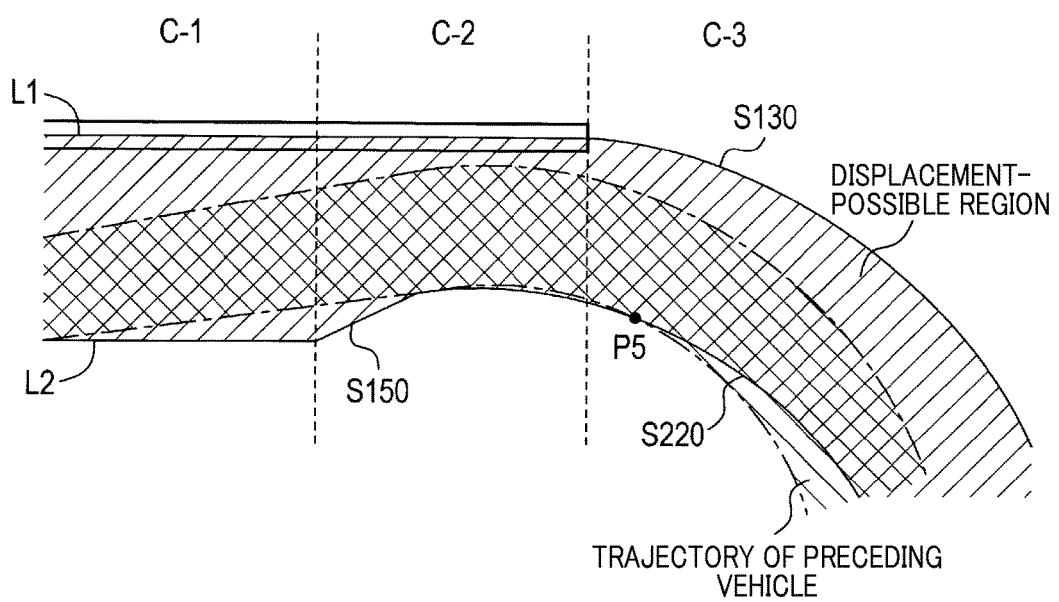
FIG. 5 is a third birds-eye view diagram that exemplifies a displacement-possible region.

The trajectory calculation section 26 has a function of calculating the trajectories of the preceding vehicles that have been identified by the preceding vehicle identification section 24, and functions as trajectory calculation means. Specifically, based on the boundary line information that is received from the preceding vehicle identification section 24, the trajectory calculation section 26 stores the detected positions of each preceding vehicle in the memory 14, as history information. The trajectory calculation section 26 reads out the respective stored detected positions of each of the preceding vehicles, and calculates approximation expressions that express the respective trajectories of the preceding vehicles, by applying the Hough transform or the like. This approximation expression for a preceding vehicle indicates the center position of the vehicle, with respect to the width direction of the preceding vehicle. Coefficients in the approximation expression include information on the width, etc., of the preceding vehicle. Hence, the trajectory of a preceding vehicle is calculated as a region having respective outer edges which are at the right-side edge and left-side edge respectively of the preceding vehicle, with respect to the width direction of the vehicle. That is to say, for example as shown in FIGS. 4 and 5, the trajectory of a preceding vehicle is expressed as a region that contains the width of the preceding vehicle. The trajectory calculation section 26 outputs trajectory information that expresses the trajectories of each of the preceding vehicles, to the region estimation section 36, etc. With this embodiment, when the reliability of obtaining the trajectory information is low, a flag which indicates that condition is included in the trajectory information that is outputted. It is judged that the reliability is low, for example, when the number of detected positions of a preceding vehicle is less than a predetermined value, or the dispersion of the detected positions of respective preceding vehicles that constitute the trajectory (for example the scattering degree of the trajectories) is outside a predetermined standard range.

The host vehicle position acquisition section 30 has a function of acquiring position information that shows the current position of the host vehicle, and functions as host vehicle position acquisition means. Specifically, the host vehicle position acquisition section 30 receives position information that is synchronized with the output from the ADAS locator 6, and transmits the received position information to the traffic lane acquisition section 32 and the region estimation section 36, etc.

The traffic lane acquisition section 32 has a function of acquiring vehicle information that includes the road shape and road type of the host-vehicle lane, from road map information that includes road shapes, based on the detected position of the host vehicle as expressed by the position information which is obtained by the host vehicle position acquisition section 30, and the traffic lane acquisition section 32 functions as traffic lane acquisition means. Specifically, based on the position information that is obtained by the host vehicle position acquisition section 30, the traffic lane acquisition section 32 outputs traffic lane information read-out commands in accordance with the current position of the host vehicle to the ADAS locator 6. The traffic lane acquisition section 32 receives traffic lane information from the ADAS locator 6, read out from the map DB in accordance with these commands, and outputs the acquired traffic lane information to the region estimation section 36, etc.

The vehicle information acquisition section 34 has a function of acquiring vehicle information from the ECU 16 that includes detected information concerning the speed, steering angle, yaw rate, etc., of the host vehicle. Specifically, the vehicle information acquisition section 34 transmits the vehicle information that is received from the in-vehicle LAN 8, via the communication controller, to the information outputting section 38, etc.

The information outputting section 38 has a function of outputting travel target information based on the displacement-possible region that is estimated by the region estimation section 36, and functions as information acquisition means. Specifically, the information outputting section 38 uses the communication controller to transmit travel target information via the in-vehicle LAN 8, where the travel target information consists of information that directly represents the displacement-possible region itself, as estimated by the region estimation section 36, or information expressing the travel line that has been set within the host-vehicle lane based on the displacement-possible region, or information that includes both of the above. The travel line consists of information that is set based on the displacement-possible region which is estimated by the region estimation section 36, a speed vector which is calculated based on the vehicle information received from the vehicle information acquisition section 34, etc. For example, the travel line may be expressed as a curve that is obtained through approximation, by successively setting positions along the advancement direction of the host vehicle and applying the Hough transform or the like to the set positions. It would be equally possible to set these positions, within the displacement-possible region, at locations that are weighted, with respect to the width direction of the host vehicle, in accordance with the speed and advancement direction of the host vehicle.

The region estimation section 36 has a function of estimating a displacement-possible region within the host-vehicle lane, ahead of the host vehicle, based on the lane boundary lines that are identified by the lane boundary line identification section 28, and functions as region estimation means. Specifically, the region estimation section 36 is implemented through execution of displacement-possible region estimation processing, shown in the flow diagram of FIGS. 6 and 7, by the CPU 12. The displacement-possible region is estimated as a region in which the host vehicle can move, currently and subsequently. The displacement-possible region can for example be used when setting a travel line, or used as an index when producing a known type of lane departure warning or performing steering assistance.

[1-3. Displacement-Possible Region Estimation Processing]

Next, displacement-possible region estimation processing that is executed by the region estimation section 36 of the intra-lane travel control unit 10 will be described using the flow diagram of FIGS. 6 and 7. This processing is commenced in the following cases. For example, the processing may be commenced when an intra-lane travel control switch is set to the ON state at a time when the ignition switch is in the ON state, or when the ignition switch is set to the ON state at a time when the intra-lane travel control switch is the ON state. This processing is terminated when the ignition switch is set to the OFF state, or the intra-lane travel control switch is set to the OFF state.

Figure 6:
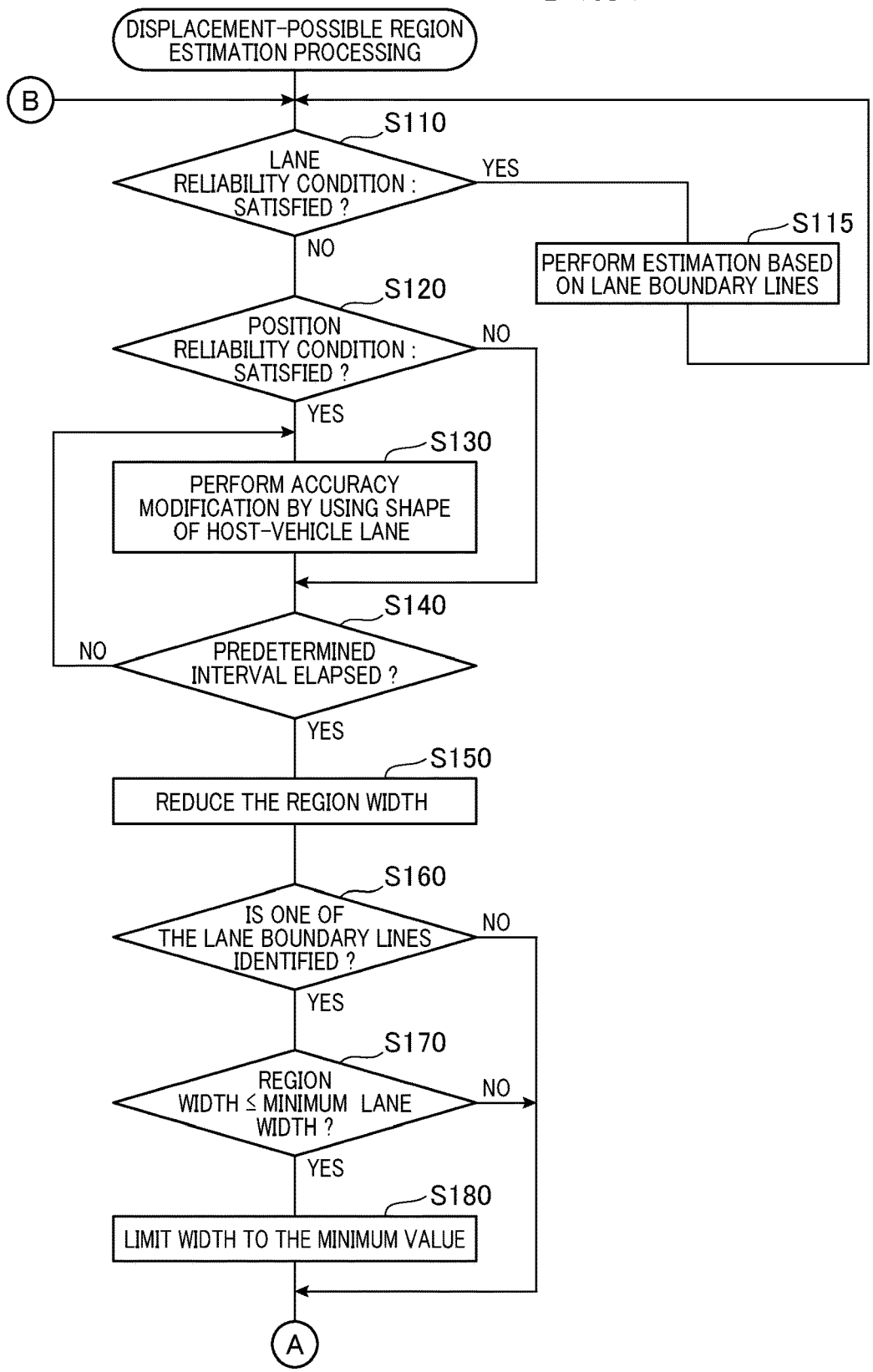
FIG. 6 is a flow diagram of displacement-possible region estimation processing (1/2).

As shown in FIG. 6, when this processing is started, the region estimation section 36 judges whether or not a predetermined reliability condition (hereinafter referred to as a traffic lane reliability condition) is satisfied for the traffic lane boundary lines that are identified by the lane boundary line identification section 28 (Step S110). If it is judged as a result that the traffic lane reliability condition is satisfied (YES in S110) then processing proceeds to S115. However if it is judged that the traffic lane reliability condition is not satisfied (NO in S110) then processing proceeds to S120.

Figure 3A:
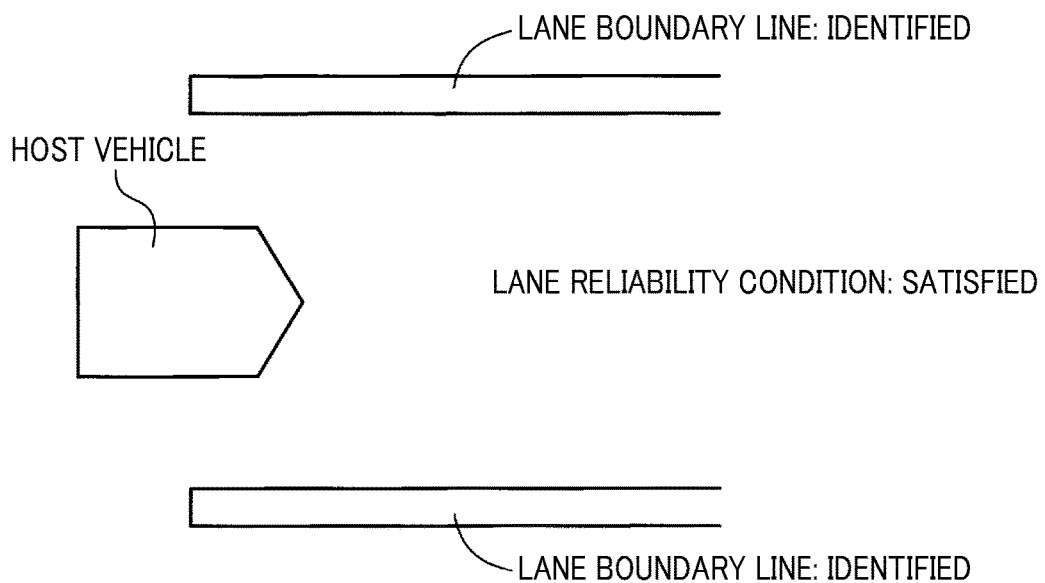
FIG. 3A is a birds-eye view diagram showing a satisfied state of a lane reliability condition.
Figure 3B:
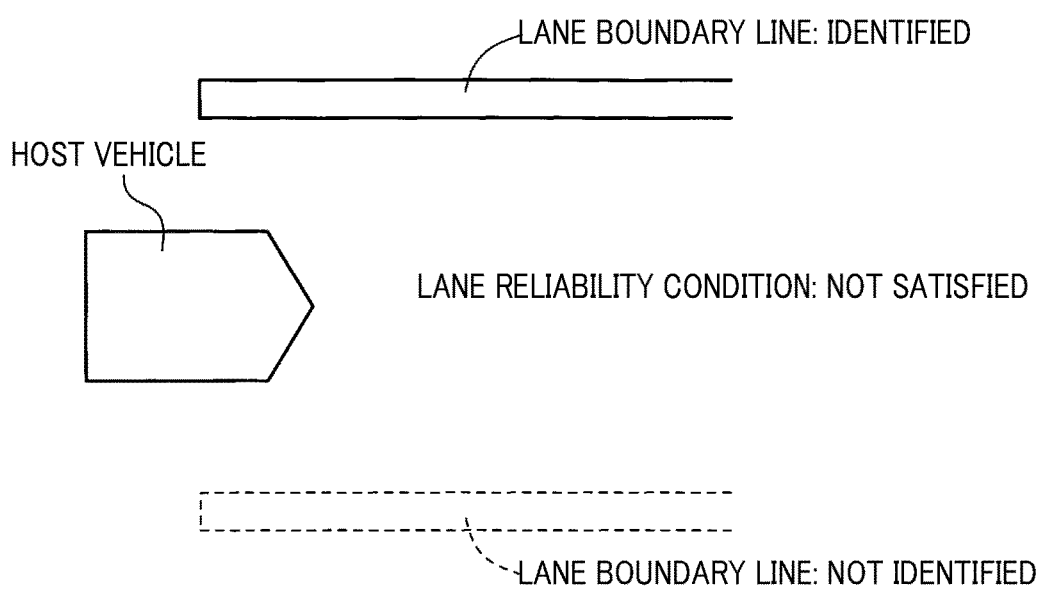
FIG. 3B is a birds-eye view diagram showing a non-satisfied state of the lane reliability condition.

The traffic lane reliability condition is a condition relating to the reliability of the identification results obtained for the lane boundary lines, by the lane boundary line identification section 28. Specifically, it is a condition that is judged based on a flag in the boundary line information which is outputted from the lane boundary line identification section 28. The satisfied/non-satisfied states of the traffic lane reliability condition are for example as shown in FIGS. 3A and 3B. FIG. 3A shows an example of a situation in which the right-side and left-side lane boundary lines that define the host-vehicle lane ahead of the host vehicle are identified. As shown in FIG. 3A, the traffic lane reliability condition is satisfied when both of the pair of right-side and left-side lane boundary lines that define the host-vehicle lane are identified. FIG. 3B shows an example of a situation in which one of the lane boundary lines that define the host-vehicle lane is identified, while the other one of these lane boundary lines has not been identified. As shown in FIG. 3B, the traffic lane reliability condition is in the non-satisfied state when at least one of the pair of left-side and right-side lane boundary lines that define the host-vehicle lane is not identified. It should be noted that it would also be possible to set, as a condition whereby the traffic lane reliability condition is in the non-satisfied state, a condition in which the type of one or both of the traffic lane identification-use objects used in identifying the lane boundary lines is not a road surface paint line (i.e., is a roadside object).

Returning to FIG. 6, the region estimation section 36 estimates the displacement-possible region in the host-vehicle lane ahead of the host vehicle based on the pair of right-side and left-side lane boundary lines that are identified by lane boundary line identification section 28 (Step S115), then processing returns to S110. Specifically, as shown by the section A-1 in FIG. 4A for example, a line that is oriented along the center positions (with respect to the width direction) of one of the road surface paint lines which define the host-vehicle lane, and a line that is oriented along the center positions (with respect to the width direction) of the other one of these road surface paint lines, are respectively designated as one edge line L1 and the other edge line L2. The region estimation section 36 estimates the region defined by these lines L1 and L2 to be the displacement-possible region, as shown by the hatched-line region in the diagram. In FIG. 4A, a plurality of situations are shown for the case in which the displacement-possible region ahead of the host vehicle is estimated under the conditions that the road shape of the host-vehicle lane is linear, and that there is no preceding vehicle. In FIG. 4A, the assumed situations are shown as sections A-1 to A-5 in an XY coordinate plane, with the current position of the host vehicle as reference.

Returning to FIG. 6, the region estimation section 36 judges whether or not a reliability condition (hereinafter referred to as the position reliability condition) is satisfied, with respect to the accuracy of the position information (Step S120). If it is judged as a result that the position reliability condition is satisfied (YES in S120) then processing proceeds to S130. On the other hand, if it is judged that the position reliability condition is not satisfied (NO in S120), processing proceeds to S140.

The position reliability condition is a condition relating to the current position of the host vehicle as detected by the ADAS locator 6. Specifically, judgement of this condition is made based on a flag in the position information that is outputted from the ADAS locator 6. It will be assumed for example that the position reliability condition is satisfied when the current position of the host vehicle has been calculated in a state in which radio waves were being received from GPS satellites. If the current position of the host vehicle has been calculated under a condition in which radio waves could not be received from GPS satellites, then the position reliability condition is not satisfied. It should be noted that it would be equally possible to add that, even if the current position of the host vehicle was obtained in the condition in which radio waves could not be received from GPS satellites, the position reliability condition will be satisfied if the duration of that condition of non-reception does not exceed a predetermined interval.

The region estimation section 36 executes processing for improving the estimation accuracy of the displacement-possible region, using the road shape of the host-vehicle lane as expressed in the traffic lane information received from the traffic lane acquisition section 32 (Step S130), then processing proceeds to S140. For example as shown by line L2 in section A-2 and line L1 in section A-3 of FIG. 4A, and line L1 in section B-2 of FIG. 4B, if the road shape of the host-vehicle lane is linear, the lines L1 and L2 are set as follows. Specifically, the region estimation section 36 linearly extends the lines L1, L2 corresponding to the lane boundary lines in the previous section, to set the lines L1, L2 of the current section. For example as shown for the line L1 in section C-3 of FIG. 5, in a case in which the road shape of the host-vehicle lane is curved, the lines L1, L2 are set as follows. Specifically, the region estimation section 36 sets the line L1 of the current section by extending the lane boundary line which corresponds to line L1 in the preceding section, with that lane boundary line being extended along a curve having the shape (curvature) of line L1 in the preceding section. In that way, even if one of the lane boundary lines cannot be identified, the region estimation section 36 can improve the accuracy of estimating the displacement-possible region, by using the road shape of the host-vehicle lane. It should be noted that FIG. 4B shows an example of estimating the displacement-possible region ahead of the host vehicle, for a plurality of situations in which the road shape is linear and in which there is a preceding vehicle. In FIG. 4B, each of the assumed situations of sections B-1 to B-5 is represented in an XY plane, with the current position of the host vehicle as reference. Furthermore FIG. 5 shows an example of a plurality of assumed situations, for the case of estimating the displacement-possible region of the host vehicle when the road shape of the host-vehicle lane changes from a linear to a curved shape, and there is a preceding vehicle. In FIG. 5, each of the assumed situations of sections C-1 to C-3 is represented in an XY plane, with the current position of the host vehicle as reference.

Returning to FIG. 6, in the judgement processing of S110, the region estimation section 36 judges whether or not the condition whereby the lane reliability condition is not satisfied (judgment result is negative) has continued for a predetermined interval (Step S140). If it is judged as a result that the predetermined interval has elapsed (YES in S140), then processing proceeds to S150. On the other hand, if it is judged as a result that the predetermined interval has not yet elapsed (NO in S140), then processing returns to S130. The predetermined interval is defined beforehand as the time required until the width (hereinafter referred to as the region width) of the displacement-possible region in the lane width begins to be reduced, and can be determined for example by travel testing, or through simulation, etc. It should be noted that in FIGS. 4 and 5, the predetermined interval is shown as corresponding to a single section, for simplicity of description.

In step S150, the region estimation section 36 commences reduction of the region width of the displacement-possible region, which was complemented by the processing of S130, then processing proceeds to S160. In the complementary processing of S130, the region estimation section 36 extends the lines L1, L2 until the predetermined interval has elapsed, with the extensions of the lines L1, L2 being in directions such as to cause the width of the displacement-possible region to contract. The lines L1, L2 are extended in the respective sections, for example as shown for line L2 in sections A-3 and A-4 and line L1 in section A-4 in FIG. 4A, line L2 of section B-2 and line L1 of section B-3 in FIG. 4B, and line L2 of section C-2 in FIG. 5. Specifically, the region estimation section 36 sets the lines L1 and L2 within the sections concerned by using the termination point of each line in the preceding section as a base point for the extension, with the lines sloping towards the width-direction center of the displacement-possible region. In that way the region estimation section 36 estimates the displacement-possible region by reducing the region width, using the set lines L1 and L2.

Returning to FIG. 6, the region estimation section 36 judges whether either one of the pair of lane boundary lines that define the host-vehicle lane is identified (Step S160). If it is judged as a result that one of these lane boundary lines is identified (YES in S160), the processing proceeds to S170. On the other hand if the lane boundary lines are not identified (NO in S160), the processing proceeds to S190 of FIG. 7. This judgement is based upon the boundary line information that is outputted from the lane boundary line identification section 28.

In step S170, the region estimation section 36 judges whether or not the region width of the displacement-possible region, which has been reduced by the processing of S130, is less than or equal to a minimum traffic lane width, with the minimum traffic lane width being based upon the road type of the host-vehicle lane. If it is judged as a result that the region width is less than or equal to the minimum traffic lane width (YES in S170), processing proceeds to S180. However if it is judged that the region width exceeds the minimum traffic lane width (NO in S170), processing proceeds to S190 in FIG. 7. The minimum traffic lane width is a predetermined traffic lane width, which limits the extent of reduction of the region width of the displacement-possible region. The minimum traffic lane width can be determined for example based upon the type of road, as expressed in the traffic lane information that is obtained from the traffic lane acquisition section 32. As an example, in a case in which the type of road is a vehicle-only road, high-speed road or the like, the minimum traffic lane width is set to a value that is smaller than a standard value, while when the road is a general type of street, the minimum traffic lane width is set to a value that is greater than the standard value. It should be noted that it would be equally possible to set the minimum traffic lane width in accordance with the vehicle width, in a case in which the vehicle width of the host-vehicle lane is contained in the vehicle information.

In step S180, the region estimation section 36 begins processing to for limiting the minimum value of the region width, using the minimum value of traffic lane width, which was the judgement reference in the judgement processing of S170, and processing then proceeds to S190. For example in the case shown for section A-5 in FIG. 4A, when one line L1 lies along the center points (with respect to the width direction) of one of the road surface paint lines that was identified by the processing of S160, the region estimation section 36 extends the other line L2 such that the distance between the lines L1 and L2 in the traffic lane width direction does not fall below the minimum traffic lane width value. In that way, the region estimation section 36 sets the displacement-possible region width by reducing the region width while applying a limit value (hereinafter referred to as the first limit value) to the extent of the width reduction. It should be noted that the first limit value is set here based upon the minimum traffic lane width, however for example it would be equally possible to make the first limit value greater than the minimum traffic lane width.

Next, when the processing proceeds to step S190 as shown in FIG. 7, a decision is made by the region estimation section 36 as to whether or not a predetermined reliability condition (hereinafter referred to as a trajectory reliability condition) is satisfied for the trajectory that is calculated by the trajectory calculation section 26 (Step S190). If it is judged as a result that the trajectory reliability condition is satisfied (YES in S190), processing proceeds to S200. However if it is judged that the trajectory reliability condition is not satisfied (NO in S190), then processing returns to S110.

The trajectory reliability condition is a condition relating to the reliability of the trajectory of a preceding vehicle that is calculated by the trajectory calculation section 26. Specifically, the condition is judged based on a flag in the trajectory information that is outputted from the trajectory calculation section 26, or on a flag in the preceding vehicle information that is outputted from the preceding vehicle identification section 24. The trajectory reliability condition is not satisfied, for example, in the following cases. A condition in which no preceding vehicle is identified in the host-vehicle lane, or in which the number of detected preceding vehicles does not attain a predetermined value, can be cases in which the trajectory reliability condition is not satisfied. Furthermore when the degree of scattering of the detected positions of the preceding vehicles is greater than a standard value, then this is taken to be a condition in which the trajectory reliability condition is not satisfied.

In step S200, the region estimation section 36 executes processing for improving the estimation accuracy of the displacement-possible region, using the trajectory of a preceding vehicle, expressed by the trajectory information received from the trajectory calculation section 26, and processing then proceeds to S210. For example the preceding lines L1 and L2 are extended from ground point P1 on line L2 in section B-2, ground point P2 on line L1 in section B-3, and ground point P3 on line L2 in section B-4, as shown in FIG. 4B. Specifically, taking the intersections between the lines L1 and L2 preceding these ground points and the edges of the trajectory of the preceding vehicle as base points, the region estimation section 36 sets the lines L1 and L2 of the current section by extending the lines L1 and L2 along the outer edges of the trajectory of the preceding vehicle. In that way, even if the lane boundary lines cannot be identified, the region estimation section 36 uses the trajectory of the preceding vehicle to correct the estimation of the displacement-possible region.

Furthermore, in step S200, the region estimation section 36 expands the width of the displacement-possible region. At that time, with of ground points in the traffic lane width direction of the host-vehicle lane in the XY coordinate plane as abscissas, the abscissas of respective ground points forming the outer edges of the trajectory of the preceding vehicle are designated as the preceding vehicle abscissas, and the abscissas of respective ground points forming the center lines (with respect to the width direction) of the lane boundary lines are designated as the boundary line abscissas. The region estimation section 36 expands the width of the displacement-possible region based on those of the coordinates which maximize distance in the traffic lane width direction. Specifically, the region estimation section 36 expands the width of the displacement-possible region based on two of the preceding vehicle abscissas, or on a combination of preceding vehicle abscissas and the boundary line abscissas. For example FIG. 4B shows an example of a combination of preceding vehicle abscissas and boundary line abscissas whereby distance in the traffic lane width direction is expanded by ground point P21 on line L2 and ground point P11 on line L1 of section B-2, and ground point P12 on line L1 and ground point P22 on line L2 of section B-4. Specifically, the region estimation section 36 expands the width of the displacement-possible region by extending the lines L1 and L2 respectively such as to maintain the preceding vehicle abscissas fixed within a predetermined interval, having as base points the ground points P21 and P12. This will be described in more detail, taking ground point P21 as an example. In the section that extends from ground point P21 to ground point P4, the preceding vehicle abscissas are held fixed on the line L2, irrespective of changes in the trajectory of the preceding vehicle along the traffic lane width direction. Hence, the width of the displacement-possible region is expanded to a greater degree than when extension is performed along the outer edges of the trajectory of the preceding vehicle. It should be noted that as shown in FIG. 4B, in a case in which a predetermined interval has elapsed since such an expansion of the displacement-possible region has occurred, extension is then performed from ground point P4 as a base point, along a direction which slopes towards the center (with respect to the width direction) of the displacement-possible region. In that way, the region estimation section 36 estimates the displacement-possible region by extending the lines L1 and L2 in directions such as to contract the width of the displacement-possible region. With the assumed situation of FIG. 4B, the host vehicle traffic lane is pictured as being linear, however in a case in which the host-vehicle lane has a curved shape too, the width of the displacement-possible region can be expanded by basically the same method. However when the host-vehicle lane is curved, the region estimation section 36 estimates the displacement-possible region by extending the lines L1 and L2 such as to maintain the curve shape (curvature).

Returning to FIG. 7, the region estimation section 36 again judges whether or not the position reliability condition is satisfied (Step S210). If it is judged as a result that the position reliability condition is satisfied (YES in S210), processing proceeds to S220. However if it is judged that the position reliability condition is not satisfied (NO in S210), processing proceeds to S225.

In step S220, the region estimation section 36 begins processing for limiting the expansion of the width of the displacement-possible region, using the road shape of the host-vehicle lane, which is expressed by the traffic lane information received from the traffic lane acquisition section 32. Processing then returns to S110 shown in FIG. 6. Specifically, in a case in which the road shape of the host-vehicle lane is curved and the region width is expanded by an outward-oriented change of the trajectory of the preceding vehicle, in the direction of the traffic lane width, the region width is expanded as follows. For example in FIG. 5, the region estimation section 36 extends the curved line L2, from the ground point P5 on line L2 in section C-3 as a base point, along the road shape (curvature) that is expressed by the traffic lane information. As a result, the region estimation section 36 sets a limit (hereinafter referred to as the second limit value) to the expansion of the region width of the displacement-possible region. It should be noted that the second limit value is a value that is set based upon the road shape, and could be set for example such that the greater the curvature of the road, the higher is the second limit value. Furthermore it would be equally possible for the ground point P5 that is the base point of the curve to be set by detecting the behavior of the preceding vehicle, based on the trajectory that expressed by the trajectory information, and using travel estimation results for the preceding vehicle (estimated from the detected behavior) to set the ground point P5. As an example of such behavior that could be envisaged, the trajectory of the preceding vehicle might become shifted towards the exterior of the traffic lane before the vehicle enters a curve. Hence, the base point of a curve can be estimated by detecting such behavior.

Returning to FIG. 7, in step S225, the region estimation section 36 judges whether or not either of the pair of lane boundary lines that define the host-vehicle lane has been identified by the lane boundary line identification section 28. If it is judged as a result that either of these lane boundary lines has been identified (YES in S225), processing proceeds to S230. However if it is judged that neither of these lane boundary lines has been identified (NO in S225), processing returns to the processing of S110 in FIG. 6.

In step S230, the region estimation section 36 judges whether or not the region width of the displacement-possible region that has been expanded by the processing of step S200 is the maximum traffic lane width or more, which is based on the road type of the host-vehicle lane. If it is judged as a result that the region width is the maximum traffic lane width or more (YES in S230), processing proceeds to S240. However if it is judged that the region width is less than the maximum traffic lane width (NO in S230), processing returns to the processing of S110 in FIG. 6. The maximum traffic lane width is a width that is predetermined for limiting the maximum value of the region width of the displacement-possible region, and can for example be determined based on the road type that is expressed in the traffic lane information received from the traffic lane acquisition section 32. As an example, when the type of road is a vehicle-only road, high-speed road or the like, the maximum traffic lane width is set to a value that is smaller than a standard value, while when the road is a general type of street, the maximum traffic lane width is set to a value that is greater than the standard value. It should be noted that it would be equally possible to set the maximum traffic lane width in accordance with the vehicle width, when the vehicle width of the host-vehicle lane is contained in the vehicle information.

In step S240, the region estimation section 36 begins processing for limiting the maximum value of the region width, using the maximum value of traffic lane width, which was the judgement reference in the judgement processing of S230, and processing then returns to S110 in FIG. 6. For example in the case shown in FIG. 4B for section B-5, when one line L1 lies along the center points (with respect to the width direction) of one of the road surface paint lines that was identified by the processing of S225, the region estimation section 36 extends the other line L2 such that the distance between the lines L1 and L2 in the traffic lane width direction does not exceed the maximum traffic lane width. In that way, the region estimation section 36 sets the displacement-possible region width by increasing the region width while applying a limit value (hereinafter referred to as the third limit value) to the extent of the width increase. It should be noted that the third limit value is set based upon the maximum traffic lane width, and it would be possible for example to set the third limit value equal to the maximum traffic lane width, or to make it smaller than the maximum traffic lane width.

[1-4. Effects]

As described above, the following effects are obtained with the intra-lane travel control apparatus 1 of the present embodiment.

(1a) The road shape of the host-vehicle lane is used when estimating the displacement-possible region ahead of the host vehicle in the host-vehicle lane. As a result, the intra-lane travel control apparatus 1 can improve the estimation accuracy of the displacement-possible region with a comparatively high probability, irrespective of the conditions of the environment of the host vehicle, such as the presence or absence of a preceding vehicle. Furthermore, the intra-lane travel control apparatus 1 can set a smooth travel line, based on the displacement-possible region that is thus estimated. Hence, with the intra-lane travel control apparatus 1, even if the lane boundary lines cannot be identified, the travel safety of the host vehicle can be enhanced by improving the accuracy of estimating the displacement-possible region ahead of the host vehicle in the host-vehicle lane, even if the lane boundary lines cannot be identified.

(2a) With the intra-lane travel control apparatus 1 of the present embodiment, in the processing for estimating the displacement-possible region, it is necessary for the pair of left/right lane boundary lines that define the host-vehicle lane to be identified by the lane boundary line identification section 28, for the lane reliability condition to be satisfied. The intra-lane travel control apparatus 1 complements the accuracy of estimating the displacement-possible region, if either one of that pair of lane boundary lines is not identified, and can thereby effectively determine occasions for performing such complementing.

(3a) With the intra-lane travel control apparatus 1 of the present embodiment, in the processing for estimating the displacement-possible region, reduction of the region width of the displacement-possible region is commenced when the state in which the lane reliability condition is not satisfied has continued for longer than a predetermined interval. Hence, as the accuracy of estimating the host-vehicle lane decreases, the displacement-possible region is made to converge. For that reason, with the intra-lane travel control apparatus 1, operations such as lane departure warnings, steering assistance, etc., can readily be executed in accordance with decrease of the traffic lane identification accuracy.

(4a) With the intra-lane travel control apparatus 1 of the present embodiment, when either one of the pair of left/right lane boundary lines that define the host-vehicle lane is identified by the lane boundary line identification section 28, the extent of reduction of the region width of the displacement-possible region is limited, by using a minimum traffic lane width that is based on the road shape of the host-vehicle lane. As a result, the intra-lane travel control apparatus 1 can suppress the unnecessary use of operations such as lane departure warnings, steering assistance, etc., (i.e., can prevent conditions in which these operations are performed unnecessarily), in accordance with increasing accuracy of traffic lane identification.

(5a) With the displacement-possible region estimation processing executed by the intra-lane travel control apparatus 1 of the present embodiment, in a case in which the lane reliability condition is not satisfied but in which the trajectory reliability condition is satisfied, the accuracy of estimating the displacement-possible region is further modified by using the trajectory of a preceding vehicle. As a result, the intra-lane travel control apparatus 1 increases the number of methods that can be selected for improving such an estimation accuracy, and so can increase the host-vehicle lane estimation accuracy, for example.

(6a) In the processing for estimating the displacement-probable region executed by the intra-lane travel control apparatus 1 of the present embodiment, the region width of the displacement-possible region is maximized, with distance in the traffic lane width direction being increased based on two of the preceding vehicle abscissas, or on a combination of preceding vehicle abscissas and lane boundary line abscissas. As a result, the intra-lane travel control apparatus 1 enables, for example, the host-vehicle lane to be estimated by using the wavering progress of a preceding vehicle, without following the wavering.

(7a) With the intra-lane travel control apparatus 1 of the present embodiment, when the distance along the traffic lane width direction is the maximum traffic lane width or more (which is determined based on the road shape of the host-vehicle lane), the region width of the displacement-possible region is limited to a maximum width. As a result, the intra-lane travel control apparatus 1 can reduce the possibility that the host vehicle will depart from the host-vehicle lane, when the host vehicle is following a preceding vehicle that changes its traffic lane.

(8a) With the displacement-possible region estimation processing executed by the intra-lane travel control apparatus 1 of the present embodiment, the maximum value of the region width of the displacement-possible region is limited by using the road shape of the host-vehicle lane, as expressed by the traffic lane information that is obtained by the traffic lane acquisition section 32. As a result, when for example the host vehicle is following a preceding vehicle that is travelling around a curve, the intra-lane travel control apparatus 1 can reduce the possibility that the host vehicle will depart from the host-vehicle lane.

(9a) With the displacement-possible region estimation processing executed by the intra-lane travel control apparatus 1 of the present embodiment, when the position reliability condition is satisfied, the accuracy of estimating the displacement-possible region is modified by using the road shape of the host-vehicle lane, as expressed by the traffic lane information that is obtained by the traffic lane acquisition section 32. When for example the accuracy of detecting the current position of the host vehicle is low, the road shape of the host-vehicle lane is not utilized by the intra-lane travel control apparatus 1, and hence the possibility of lowering the accuracy of estimating the displacement-possible region is decreased.

[2. Other Embodiments]

An embodiment of a intra-lane travel control apparatus has been described above referring to an embodiment, however the technology of the present disclosure is not limited to the above embodiment, and may be implemented in various forms.

(2A) With the above embodiment, the lane reliability condition is not satisfied if at least one of the pair of left/right lane boundary lines that define the host-vehicle lane is not identified, however the invention is not limited to this. For example it would be equally possible to arrange that, even when both of the left/right lane boundary lines are identified, the lane reliability condition is not satisfied if the types of traffic lane identification-use objects used to identify one or both of the lane boundary lines are not road surface paint lines (i.e., are roadside objects). Furthermore it would be equally possible to arrange that, even if the traffic lane identification-use objects are road surface paint lines, the lane reliability condition is not satisfied if the variation in brightness that is used in edge detection is less than a predetermined threshold value.

(2B) It would be possible for the functions of the above embodiment to be dispersed among a plurality of constituent elements having respective functions, or for the functions of a plurality of constituent elements to be integrated into a single constituent element. Moreover it would be possible for at least a part of the configuration of the above embodiment to be replaced by a known configuration having a similar function. Furthermore it would be possible to omit part of the configuration of the above embodiment. Moreover it would be It would be equally possible for the functions of the above embodiment to be dispersed among a plurality of constituent elements having respective functions, or for the functions of a plurality of constituent elements to be integrated into a single constituent element. Moreover it would be possible for at least a part of the configuration of the above embodiment to be replaced by a known configuration having a similar function. Furthermore it would be possible to omit a part of the configuration of the above embodiment. Moreover it would be possible to replace or augment a part of the configuration of the above embodiment with another part of the configuration. The embodiment of a intra-lane travel control apparatus according to the present disclosure corresponds to every aspect contained in the technical concepts (technical range) specified by the objectives of the present disclosure.

(2C) The functions provided by the intra-lane travel control apparatus and intra-lane travel control method of the present disclosure could be provided in the following forms. As a specific example, the functions could be provided by a system or the like which implements the elements of the intra-lane travel control apparatus 1. Furthermore, one or a plurality of programs whereby a computer is caused to function as the intra-lane travel control apparatus 1, and a storage medium (for example, a semiconductor memory) in which all or part of the program(s) is/are stored, etc., can be cited as examples.

REFERENCE SIGNS LIST

1 . . . Intra-lane travel control apparatus
2 . . . Image sensor
4 . . . Radar sensor
5 . . . Object detection unit
6 . . . ADAS locator
8 . . . In-vehicle LAN
10 . . . Intra-lane travel control unit
12 . . . CPU
14 . . . Semiconductor memory
16 . . . ECU
18 . . . Controlled object
22 . . . Object acquisition section
24 . . . Preceding vehicle identification section
26 . . . Trajectory identification section
28 . . . Lane boundary line identification section
30 . . . Host vehicle position acquisition section
32 . . . Traffic lane acquisition section
34 . . . Vehicle information acquisition section
36 . . . Region estimation section
38 . . . Information outputting section

The invention claimed is:

1. An intra-lane travel control apparatus installed in a vehicle, comprising:
an object acquisition means for acquiring object information that includes detected positions of objects that are ahead of a host vehicle;
a host vehicle position acquisition means for acquiring position information expressing a detected position of the host vehicle;
a traffic lane acquisition means for acquiring traffic lane information that includes a road shape of a host-vehicle lane, which is a travel lane on which the host vehicle is traveling, with the traffic lane information being acquired from road map information that includes the road shape, based on the detected position of the host vehicle that is expressed by the position information acquired by the host vehicle position acquisition means;
a lane boundary line identification means for identifying lane boundary lines that define the host-vehicle lane, based on the detected positions of predetermined traffic lane identification-use objects, the detected positions being contained in the object information that is acquired by the object acquisition means;
a region estimation means for estimating a displacement-possible region that is ahead of the host vehicle, in the host-vehicle lane, based on the lane boundary lines acquired by the lane boundary line identification means; and
an information outputting means for outputting information based on the displacement-possible region that is estimated by the region estimation means, wherein
the region estimation means improves estimation accuracy of the displacement-possible region by using the road shape of the host-vehicle lane, expressed in the traffic lane information that is acquired by the traffic lane acquisition means, in response to a predetermined lane reliability condition not being satisfied for the lane boundary lines that are identified by the lane boundary line identification means, and
the region estimation means reduces a region width of the displacement-possible region, in response to a state in which the lane reliability condition is not satisfied has continued for longer than a predetermined duration.

2. The intra-lane travel control apparatus according to claim 1, wherein the region estimation means specifies the lane reliability condition as being satisfied in response to a pair of the lane boundary lines, that define the host-vehicle lane, are identified by the lane boundary line identification means.

3. The intra-lane travel control apparatus according to claim 1 wherein in response to either one of the pair of the lane boundary lines that define the host-vehicle lane being identified by the lane boundary line identification means, the region estimation means limits the minimum value of the region width of the displacement-possible region, using a minimum traffic lane width that is based on a road type of the host-vehicle lane.

4. The intra-lane travel control apparatus according to claim 1, comprising;
a preceding vehicle identification means for identifying a preceding vehicle that is in the traffic lane of the host vehicle, based on detected position of other vehicles, contained in the object information that is acquired by the object information acquisition means; and
a trajectory calculation means for calculating a trajectory of the preceding vehicle that is identified by the preceding vehicle identification means,
wherein in response to the lane reliability condition not being satisfied and a predetermined trajectory reliability condition being satisfied for the trajectory of the preceding vehicle calculated by the trajectory calculation means, the region estimation means improves the position accuracy of the displacement-possible region by using the trajectory of the preceding vehicle (S200 to S240).

5. The intra-lane travel control apparatus according to claim 4, wherein with the current position of the host vehicle as reference, and ground points along the width direction as abscissas, the region estimation means enlarges distance in the lane width direction with the abscissas of ground points that constitute the trajectory of the preceding vehicle as preceding vehicle abscissas and with the abscissas of ground points that constitute the lane boundary lines as lane boundary line abscissas, and enlarges the region width of the displacement-possible region based on two of the abscissas of the preceding vehicle or on a combination of the preceding vehicle abscissas and the boundary line abscissas.

6. The intra-lane travel control apparatus according to claim 5, wherein the region estimation means limits the maximum value of the region width of the displacement-possible region in response to the distance along lane width direction being a maximum lane width or more, that is based on the road type of the host-vehicle lane.

7. The intra-lane travel control apparatus according to claim 5, wherein the maximum value of the region width of the displacement-possible region is limited by using the road shape of the host-vehicle lane, that is expressed by the traffic lane information obtained by the traffic lane acquisition means.

8. The intra-lane travel control apparatus according to claim 1, wherein in response to a predetermined position reliability condition being satisfied for the detection accuracy of the position information, the region estimation means improves the estimation accuracy of the displacement-possible region by using the road shape of the host-vehicle lane, that is expressed by the traffic lane information obtained by the traffic lane acquisition means.

9. An intra-lane travel control method executed by an intra-lane travel control apparatus installed in a vehicle, the intra-lane travel control method comprising:
    an object acquisition step of acquiring object information that includes detected positions of objects that are ahead of a host vehicle;
    a host vehicle position acquisition step of acquiring position information expressing a detected position of the host vehicle;
    a traffic lane acquisition step of acquiring traffic lane information that includes a road shape of a host-vehicle lane, which is a travel lane on which the host vehicle is traveling, with the traffic lane information being acquired from road map information that includes the road shape, based on the detected position of the host vehicle that is expressed by the position information acquired by the host vehicle position acquisition step;
    a lane boundary line identification step of identifying lane boundary lines that define the host-vehicle lane, based on the detected positions of predetermined traffic lane identification-use objects contained in the object information that is acquired by the object acquisition step;
    a region estimation step of estimating a displacement-possible region that is ahead of the host vehicle, in the host-vehicle lane, based on the lane boundary lines acquired by the lane boundary line identification step; and,
    an information outputting step of outputting information based on the displacement-possible region that is estimated by the region estimation step, wherein
    the region estimation step improves the estimation accuracy of the displacement-possible region by using the road shape of the host-vehicle lane, expressed in the traffic lane information that is acquired by the traffic lane acquisition step, in response to a predetermined lane reliability condition not being satisfied for the lane boundary lines that are identified by the lane boundary line identification step, and
    the region estimation step reduces a region width of the displacement-possible region, in response to a state in which the lane reliability condition is not satisfied has continued for longer than a predetermined duration.

10. An intra-lane travel control method executed by an intra-lane travel control apparatus installed in a vehicle, the intra-lane travel control method comprising:
    an object acquisition step of acquiring object information that includes detected positions of objects that are ahead of a host vehicle;
    a host vehicle position acquisition step of acquiring position information expressing a detected position of the host vehicle;
    a traffic lane acquisition step of acquiring traffic lane information that includes a road shape of a host-vehicle lane, which is a travel lane on which the host vehicle is traveling, with the traffic lane information being acquired from road map information that includes the road shape, based on the detected position of the host vehicle that is expressed by the position information acquired by the host vehicle position acquisition step;
    a lane boundary line identification step of identifying lane boundary lines that define the host-vehicle lane, based on the detected positions of predetermined traffic lane identification-use objects contained in the object information that is acquired by the object acquisition step;
    a region estimation step of estimating a displacement-possible region that is ahead of the host vehicle, in the host-vehicle lane, based on the lane boundary lines acquired by the lane boundary line identification step;
    an information outputting step of outputting information based on the displacement-possible region that is estimated by the region estimation step;
    a preceding vehicle identification step of identifying a preceding vehicle that is in the traffic lane of the host vehicle, based on detected position of other vehicles, contained in the object information that is acquired by the object information acquisition step; and
    a trajectory calculation step of calculating a trajectory of the preceding vehicle that is identified by the preceding vehicle identification step, wherein
    the region estimation step improves the estimation accuracy of the displacement-possible region by using the road shape of the host-vehicle lane, expressed in the traffic lane information that is acquired by the traffic lane acquisition step, in response to a predetermined lane reliability condition not being satisfied for the lane boundary lines that are identified by the lane boundary line identification step,
    in response to the lane reliability condition not being satisfied and a predetermined trajectory reliability condition being satisfied for the trajectory of the preceding vehicle calculated by the trajectory calculation step, the region estimation step improves the position accuracy of the displacement-possible region by using the trajectory of the preceding vehicle, and
    with the current position of the host vehicle as reference, and ground points along the width direction as abscissas, the region estimation step enlarges distance in the lane width direction with the abscissas of ground points that constitute the trajectory of the preceding vehicle as preceding vehicle abscissas and with the abscissas of ground points that constitute the lane boundary lines as lane boundary line abscissas, and enlarges the region width of the displacement-possible region based on two of the abscissas of the preceding vehicle or on a combination of the preceding vehicle abscissas and the boundary line abscissas.

11. An intra-lane travel control apparatus installed in a vehicle, comprising:
    an object acquisition means for acquiring object information that includes detected positions of objects that are ahead of a host vehicle;

a host vehicle position acquisition means for acquiring position information expressing a detected position of the host vehicle;

a traffic lane acquisition means for acquiring traffic lane information that includes a road shape of a host-vehicle lane, which is a travel lane on which the host vehicle is traveling, with the traffic lane information being acquired from road map information that includes the road shape, based on the detected position of the host vehicle that is expressed by the position information acquired by the host vehicle position acquisition means;

a lane boundary line identification means for identifying lane boundary lines that define the host-vehicle lane, based on the detected positions of predetermined traffic lane identification-use objects contained in the object information that is acquired by the object acquisition means;

a region estimation means for estimating a displacement-possible region that is ahead of the host vehicle, in the host-vehicle lane, based on the lane boundary lines acquired by the lane boundary line identification means;

an information outputting means for outputting information based on the displacement-possible region that is estimated by the region estimation means;

a preceding vehicle identification means for identifying a preceding vehicle that is in the traffic lane of the host vehicle, based on detected position of other vehicles, contained in the object information that is acquired by the object information acquisition means; and, a trajectory calculation means for calculating a trajectory of the preceding vehicle that is identified by the preceding vehicle identification means, wherein the region estimation means improves the estimation accuracy of the displacement-possible region by using the road shape of the host-vehicle lane, expressed in the traffic lane information that is acquired by the traffic lane acquisition means, in response to a predetermined lane reliability condition not being satisfied for the lane boundary lines that are identified by the lane boundary line identification means, in response to the lane reliability condition not being satisfied and a predetermined trajectory reliability condition being satisfied for the trajectory of the preceding vehicle calculated by the trajectory calculation means, the region estimation means improves the position accuracy of the displacement-possible region by using the trajectory of the preceding vehicle, and with the current position of the host vehicle as reference, and ground points along the width direction as abscissas, the region estimation means enlarges distance in the lane width direction with the abscissas of ground points that constitute the trajectory of the preceding vehicle as preceding vehicle abscissas and with the abscissas of ground points that constitute the lane boundary lines as lane boundary line abscissas, and enlarges the region width of the displacement-possible region based on two of the abscissas of the preceding vehicle or on a combination of the preceding vehicle abscissas and the boundary line abscissas.

12. The intra-lane travel control apparatus according to claim 11, wherein the region estimation means limits the maximum value of the region width of the displacement-possible region in response to the distance along lane width direction being a maximum lane width or more, that is based on the road type of the host-vehicle lane.

13. The intra-lane travel control apparatus according to claim 11, wherein the maximum value of the region width of the displacement-possible region is limited by using the road shape of the host-vehicle lane, that is expressed by the traffic lane information obtained by the traffic lane acquisition means.

14. The intra-lane travel control apparatus according to claim 11, wherein in response to a predetermined position reliability condition being satisfied for the detection accuracy of the position information, the region estimation means improves the estimation accuracy of the displacement-possible region by using the road shape of the host-vehicle lane, that is expressed by the traffic lane information obtained by the traffic lane acquisition means.

* * * * *